United States Patent
Quaratesi

(10) Patent No.: US 8,826,802 B2
(45) Date of Patent: Sep. 9, 2014

(54) REPLACEABLE END-PIECE FOR A VAPOUR NOZZLE OF A COFFEE MACHINE

(75) Inventor: Guido Quaratesi, Binasco (IT)

(73) Assignee: Gruppo Cimbali S.p.A., Binasco MI (IT)

(*) Notice: Subject to any disclaimer, the term of this patent is extended or adjusted under 35 U.S.C. 154(b) by 410 days.

(21) Appl. No.: 13/284,007

(22) Filed: Oct. 28, 2011

(65) Prior Publication Data

US 2012/0104038 A1    May 3, 2012

(30) Foreign Application Priority Data

Oct. 29, 2010   (EP) ..................................... 10425345

(51) Int. Cl.
*B67D 7/06* (2010.01)
*A47J 31/44* (2006.01)

(52) U.S. Cl.
CPC .................................. *A47J 31/4489* (2013.01)
USPC ............................ 99/277.2; 99/293; 99/277.1

(58) Field of Classification Search
USPC .................... 99/293, 277.1; 261/77, DIG. 26, 261/DIG. 76; 426/569, 474; 239/71, 75, 289
See application file for complete search history.

(56) References Cited

U.S. PATENT DOCUMENTS

| | | | |
|---|---|---|---|
| 2,225,521 A | | 12/1940 | Holveck |
| 2,508,788 A | * | 5/1950 | Hallinan ......................... 239/75 |
| 2,512,705 A | * | 6/1950 | Anderson et al. ................ 219/75 |
| 2,960,594 A | * | 11/1960 | Thorpe ............................ 219/75 |
| 3,132,240 A | * | 5/1964 | McCartney ................... 219/127 |
| 3,283,121 A | * | 11/1966 | Bernard et al. ........... 219/137.44 |
| 3,920,362 A | * | 11/1975 | Bradt ............................ 425/72.2 |
| 4,042,174 A | | 8/1977 | Vaughn |
| 4,735,133 A | * | 4/1988 | Paoletti ............................ 99/454 |
| 4,852,473 A | * | 8/1989 | Azpitarte Bolivar ........... 99/293 |
| 4,922,810 A | * | 5/1990 | Siccardi ........................ 99/323.1 |
| 4,945,824 A | * | 8/1990 | Borgmann ....................... 99/293 |
| 4,949,631 A | * | 8/1990 | Fregnan .......................... 99/452 |
| 4,969,602 A | * | 11/1990 | Scholl ............................ 239/298 |
| 5,065,943 A | * | 11/1991 | Boger et al. ................... 239/298 |
| 5,535,919 A | * | 7/1996 | Ganzer et al. ..................... 222/1 |
| 5,598,974 A | * | 2/1997 | Lewis et al. ................... 239/135 |

(Continued)

FOREIGN PATENT DOCUMENTS

| | | |
|---|---|---|
| EP | 0 727 167 | 8/1996 |
| EP | 0 813 909 | 12/1997 |
| EP | 2 025 270 | 2/2009 |

OTHER PUBLICATIONS

European Search Report for EP 10 42 5345, dated Apr. 1, 2011.

*Primary Examiner* — Henry Yuen
*Assistant Examiner* — Jimmy Chou
(74) *Attorney, Agent, or Firm* — Nixon & Vanderhye PC

(57) ABSTRACT

A replaceable end-piece which can be connected to the dispensing end, which is provided with connection means of the vapor nozzle of a coffee machine for heating and frothing a given quantity of milk contained in a jug, into which the nozzle is introduced. A tubular sleeve is provided with two ends, the first end of which is open and is provided with reversible connection means corresponding to those of the dispensing end of the nozzle. The sleeve defines at the inner side thereof a recess which extends in accordance with a longitudinal axis. The second end of the sleeve is also open and includes a body inserted therein, the body being provided with a plurality of channels connecting the recess to the external environment of the end-piece facing the second end of the sleeve.

7 Claims, 2 Drawing Sheets

(56) References Cited

U.S. PATENT DOCUMENTS

| | | | |
|---|---|---|---|
| 5,768,975 A * | 6/1998 | Wu | 99/290 |
| 5,768,981 A * | 6/1998 | Cicchetti | 99/453 |
| 5,769,135 A * | 6/1998 | Mahlich | 141/70 |
| 5,862,740 A * | 1/1999 | Grossi | 99/293 |
| 5,931,080 A * | 8/1999 | Roure Boada | 99/293 |
| 6,161,778 A * | 12/2000 | Haruch | 239/290 |
| 6,267,301 B1 * | 7/2001 | Haruch | 239/290 |
| 6,981,657 B1 * | 1/2006 | West | 239/227 |
| 6,997,405 B2 * | 2/2006 | Haruch | 239/690 |
| D536,925 S * | 2/2007 | Macler et al. | D7/398 |
| 7,621,465 B2 * | 11/2009 | Riney | 239/298 |
| 7,810,426 B2 * | 10/2010 | Balkau et al. | 99/323.1 |
| 8,096,483 B2 * | 1/2012 | Riney | 239/1 |
| 2005/0160918 A1 * | 7/2005 | Winstanley et al. | 99/279 |
| 2005/0284957 A1 * | 12/2005 | Haruch | 239/290 |
| 2007/0295226 A1 * | 12/2007 | Gierth et al. | 99/452 |
| 2009/0039178 A1 * | 2/2009 | Yoon | 239/135 |
| 2009/0121044 A1 * | 5/2009 | Lo et al. | 239/71 |
| 2009/0301310 A1 * | 12/2009 | Bazin et al. | 99/290 |
| 2009/0308255 A1 * | 12/2009 | Coccia et al. | 99/281 |
| 2009/0314165 A1 * | 12/2009 | Blockwoldt et al. | 99/288 |
| 2010/0147158 A1 * | 6/2010 | Muller | 99/300 |

\* cited by examiner

REPLACEABLE END-PIECE FOR A VAPOUR NOZZLE OF A COFFEE MACHINE

This application claims priority to EP Application No. 10425345.5 filed 29 Oct. 2010, the entire contents of which is hereby incorporated by reference.

FIELD OF THE INVENTION

The present invention relates to a replaceable end-piece which can be connected to the dispensing end, which is provided with connection means, of the vapour nozzle of a coffee machine used for heating and frothing a given quantity of milk contained in a jug, into which the nozzle is introduced.

BACKGROUND OF THE INVENTION

As is known, one of the services provided by a coffee machine is the dispensing of superheated vapour for heating drinks and in particular for heating the milk and optionally frothing it with an extremely fine foam in order to prepare a cappuccino.

The conventional method of bringing about the heating and frothing of the milk involves introducing into the jug, which contains the milk to be heated, a tube which, in the specific technical field, is referred to as a nozzle and which is connected to a valve which shuts off the vapour from a pipe which is connected to a vapour generator.

The vapour released by the valve is discharged by the end-piece of the nozzle and, upon contact with the cold milk in the jug, condenses and gives off sensible heat and latent heat. At the same time, the operator with suitable movements of the jug, using the kinetic energy of the vapour which, urged by the internal pressure of the generator, is introduced into the milk at a given rate, also brings about the frothing by incorporating air and mixing the mixture of air and milk until an extremely fine foam is formed.

The end-piece of the nozzle is important in optimising the process of heating and frothing. In fact, in order to form a milk foam with the characteristics of texture and persistence necessary for producing a cappuccino, it is necessary to mix the mixture of milk and air for a time of at least 15 seconds whilst the milk is in the temperature range between 30° C. and 60° C.

In order to operate so as to comply with the conditions set out above, the end-piece of the nozzle is provided with vapour discharge holes having a specific cross-section and orientation.

Milk drinking customs vary greatly from country to country. For a single drink, for example, in the United States, there are also used quantities greater than 250 cm$^3$ whilst, in Italy, for a cappuccino there are used quantities of approximately from 80 cm$^3$ to 100 cm$^3$. Consequently, the quantities of milk to be heated for each individual operation may vary, for example, from 100 cm$^3$ in order to prepare a single cappuccino up to a liter in order to prepare four drinks of the latte americano type. In order to provide efficient service, it is necessary to adapt the flow of vapour to the quantity of milk to be heated so as to froth the milk before exceeding the critical temperature of 60° C. without impairing the rapidity of service when heating large quantities and, in the case of small quantities, in order not to take the temperature beyond the critical threshold for the frothing without having had time to mix the mixture of milk and air.

In the case of operations carried out manually, the operator carries this adjustment out by acting on the flow of vapour of the valve by means of an adjustment and control knob; however, that operation involving the flow and pressure inside the nozzle being varied also causes a variation in the velocity of the vapour being discharged from the holes of the end-piece with a resultant loss in the efficiency of the action of the air being incorporated and mixed.

Therefore, the quality of frothing obtained tends to move increasingly further away from the ideal as the quantities heated become increasingly small with respect to the quantities for which the end-piece and the holes thereof were sized. However, when the quantities heated are higher with respect to those for which the holes of the end-piece have been sized, the times increase in an unacceptable manner.

For example, in the case of a machine with a nozzle which is provided with an end-piece having four holes, each having a diameter of 2 mm, and which is sized to heat and froth 1 liter of milk in approximately 1 minute, if it were instead desirable to heat and froth with this nozzle a quantity of only 100 cm$^3$, in order to mix milk and air for a time of no less than 15 seconds without simultaneously increasing the temperature of the milk above 60° C., it would be necessary to reduce the quantity of vapour, by controlling the relevant valve, to such a flow that the velocity of the vapour through the four holes of 2 mm would thereby become so low as to compromise the efficiency of the effect of conveying and mixing the air obtaining frothing of poor quality as a result.

For the quantity of milk indicated, however, the arrangement considered optimum would be a configuration of the end-piece provided with three or four holes having a diameter between 1.2 and 1.5 mm.

In order to solve the above-mentioned problems, it is known in the specific technological field to provide the coffee machines with end-pieces for vapour nozzles in the form of an accessory to be fitted to the dispensing end of the nozzle so as to be able to have, with the end-piece being replaced, different numbers of holes with different diameters.

With the development of automation, in place of the manual valves for adjusting the flow of vapour to the nozzle, there have been developed devices such as the ones described, for example, in European Patents EP 1501398 B1 and EP 1706905 B1, which bring about the operations of heating and frothing in a completely automated manner.

In those automatic devices, in addition to the functional requirements of the manual devices, the end-pieces of the nozzles further have to be sized so as to also receive a thermocouple in order to measure the temperature reached by the milk during heating and frothing.

Construction of those end-pieces involves the use of complex equipment and troublesome processing cycles so that those end-pieces in the form of replaceable accessories constitute a costly component of the nozzle and consequently of the coffee machine.

SUMMARY OF THE INVENTION

Therefore, an object of the present invention is to overcome the disadvantages encountered in relation to the prior art by providing a replaceable end-piece structure for vapour nozzles of coffee machines so that it can be obtained with simple and inexpensive processing cycles and methods which consequently make it possible to provide a great range of configurations of the end-piece of the nozzle without increasing the overall cost of the coffee machine.

The object is achieved with a replaceable end-piece which can be connected to the dispensing end which is provided with connection means of the vapour nozzle of a coffee machine for heating and frothing a given quantity of milk contained in a jug, into which the nozzle is introduced, comprising a tubular sleeve provided with two ends, the first of which is open and is provided with reversible connection means corresponding to those of the dispensing end of the nozzle, the sleeve defining at the inner side thereof a recess which extends in accordance with a longitudinal axis (X-X), whereas the second end of the sleeve is also open and includes a body inserted therein, the body being provided with a plurality of channels connecting the recess to the external environment of the end-piece facing the second end of the sleeve.

DETAILED DESCRIPTION OF THE DRAWINGS

The invention will now be described in greater detail with reference to the appended drawings, in which.

DETAILED DESCRIPTION OF THE INVENTION

Figure 1:
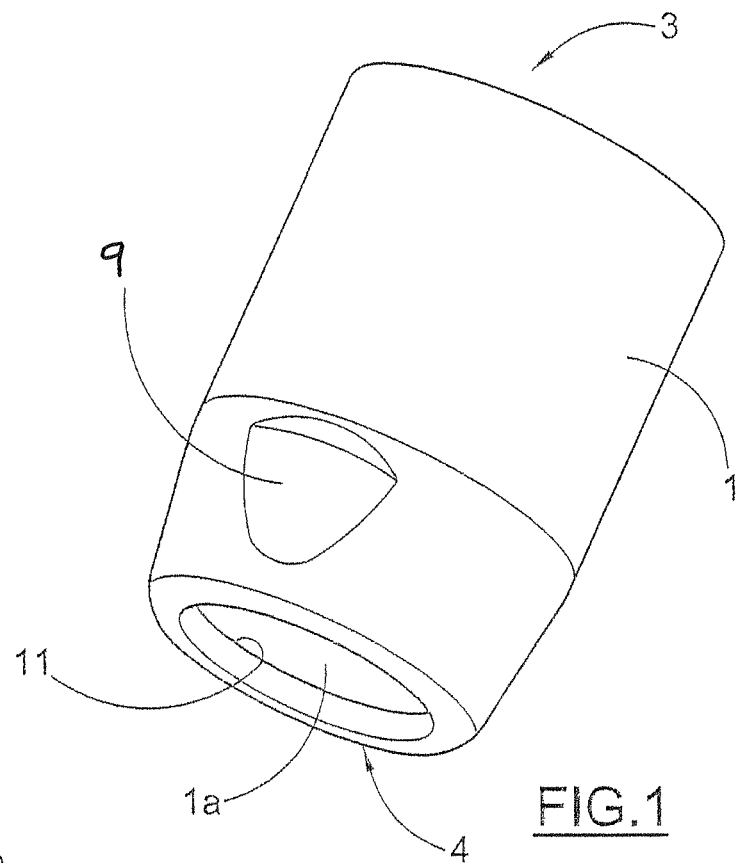
FIG. 1 is a perspective view of the sleeve portion of the end-piece according to the invention.
Figure 2:
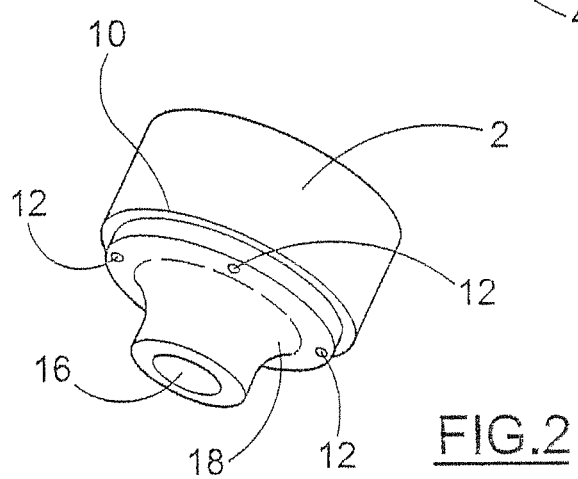
FIG. 2 is a perspective view of the insert portion of the end-piece of FIG. 1.
Figure 3:
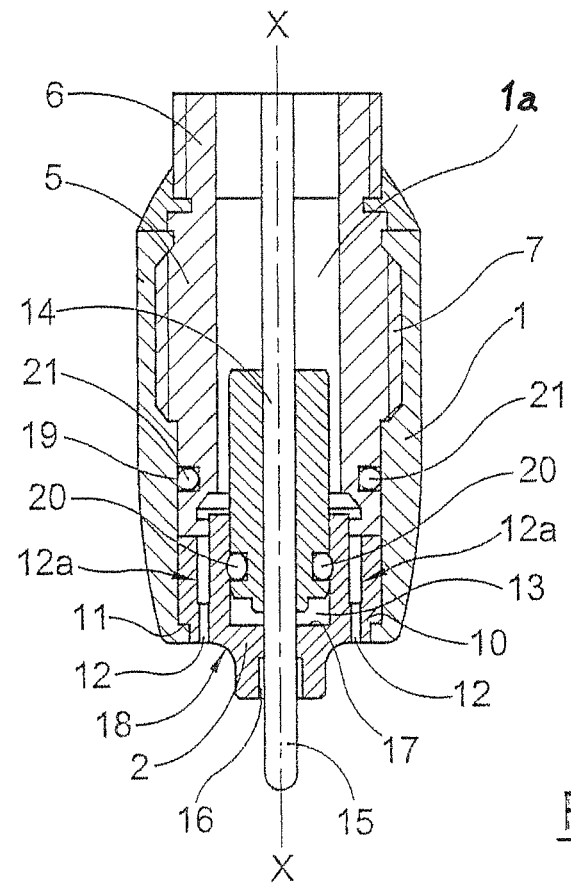
FIG. 3 is a longitudinal sectional view of the end-piece of the preceding Figures connected to the end of a nozzle with the insert portion mounted in the sleeve portion and with the end of a thermocouple mounted in the end-piece.

With reference to the above-mentioned Figures and in particular FIGS. 1, 2 and 3, the end-piece according to the invention comprises a tubular sleeve 1 and a body 2. The sleeve 1 defines at its inner side a recess 1a which extends in accordance with a longitudinal axis X-X and which is open at both ends 3 and 4. The sleeve 1 acts as a reversible connection element with respect to the end 5 of a nozzle 6 for dispensing the vapour of a coffee machine, which is not illustrated since it is conventional.

In order to be connected to the end 5 of the nozzle 6, the sleeve 1 is provided with a thread 7 which is formed at the open end 3 thereof which is intended to become engaged in a corresponding thread 8 which is provided on the outer wall of the end 5 of the nozzle.

The facet 9 on the outer surface of the sleeve 1 facilitates the screwing and unscrewing action.

The body 2 is in the form of an insert and is received inside the sleeve 1 at the open end 4 thereof, where it is supported with its annular shoulder 10 against a shoulder 11 of the same end 4.

There are arranged in the body 2 the functional parts of the end-piece, in particular the vapour discharge channels designated 12 and a space 13 for receiving a temperature sensor, particularly a thermocouple 14, whose end or hot joint 15 extends out of the passage 16 which is formed at the base 17 of the space 13, the transverse dimensions of the passage being smaller than the transverse dimensions of the base 17 of the space 13.

The channels 12 extend from an annular recess 12a, which is open towards the recess 1a of the sleeve 1, to the external environment of the end-piece facing the second end of the sleeve. In the embodiment of FIG. 3, the channels 12 are provided with an axis parallel with the longitudinal axis X-X of the tubular sleeve 1 and provided in a circle around the seat 13 for receiving the thermocouple 14.

The body 2, as can be seen in FIG. 3, is arranged substantially inside the sleeve 1 with only the portion 18, in which there is formed the passage 16, projecting outwards and being directed downwards in the milk heating zone when the nozzle is inserted in the jug which contains it.

With reference to FIG. 3, it can be seen that the thermocouple 14 is received in the seat 13 with a closure member 19 and an annular seal designated 20 being interposed.

The annular recess 12a acts as a thermal insulation chamber with respect to the thermocouple 14 in order to make it as insensitive as possible to the temperature of the vapour directed towards the channels 12.

Similarly, there is positioned between the tubular sleeve 1 and the outer wall of the end 5 of the nozzle an annular seal 21.

Figure 4:
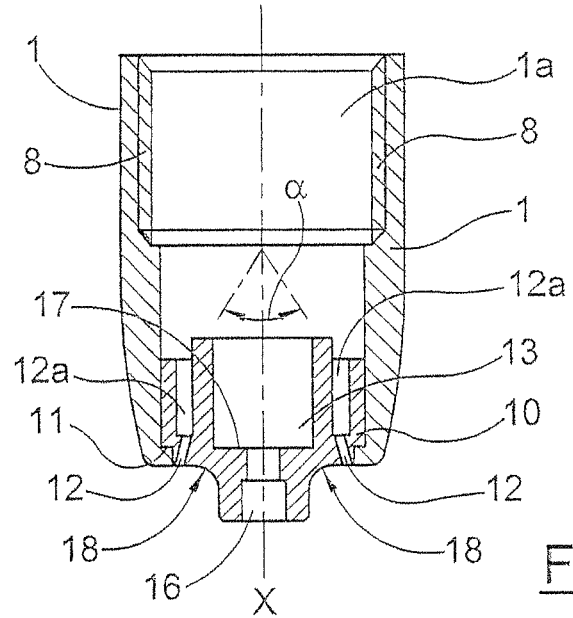
FIG. 4 is a schematic longitudinal sectional view of a second embodiment of the end-piece according to the invention.

With reference to FIG. 4, in which the elements identical to those of FIGS. 1, 2 and 3 are referred to using the same reference numerals, it can be seen that the channels 12 for dispensing the vapour are provided at an angle with respect to the axis X-X of the sleeve 1 and in particular diverge with respect to that axis.

The angle α formed by the axis of the channels 12 with respect to the axis X-X is preferably between 80° and 100°.

It will be appreciated from the above description that the body 2, which is in the form of an insert separate from the sleeve 1 and which can be assembled therewith, can be produced by stamping, for example, from thermoplastic material, which is suitable in terms of compatibility with foodstuffs and which is temperature-resistant, with obvious savings in processing operations. In a preferred, though non-exclusive embodiment thereof, it is in the form of a tubular body.

The sleeve 1 in particular can advantageously reproduce and retain the form of the original design both of the nozzle and of the coffee machine, affording the advantage of being able to implement the functional features relating to the number of channels 12, their diameter and optionally their inclination with respect to the axis X-X of the sleeve 1 without having a negative effect on the form of the sleeve 1.

What I claim is:

1. A coffee machine comprising a replaceable end-piece having means for connecting to a vapour dispensing end of a vapour nozzle of said coffee machine for heating and frothing a given quantity milk contained in a jug, into which the nozzle is introduced, a first reversible connection means on said vapour dispensing end, said end-piece comprising a tubular sleeve provided with two ends, a first of which is open and is provided with second reversible connection means corresponding to the first reversible connection means on the vapour dispensing end of the nozzle, said tubular sleeve having an inner side with a recess which extends in accordance with a longitudinal axis (X-X), whereas a second end of said sleeve is also open and includes a body which is inserted therein, said body being provided with a plurality of channels connecting said recess to an external environment of the end-piece facing the second end of the sleeve, said end-piece comprising a space for receiving a temperature sensor which can detect the temperature reached by the milk in a region of the second end of the sleeve, wherein plurality of channels of the body is provided around the space for receiving the temperature sensor and extend from a base of an annular recess which extends around said space for receiving the temperature sensor.

2. An end-piece according to claim 1, wherein the space for receiving a temperature sensor is open towards the recess of the tubular sleeve with a base provided with a passage which is open towards an outer side of the second end of the sleeve, the transverse dimensions of the passage being less than the transverse dimensions of the base of the space.

3. An end-piece according to claim 1, wherein the body extends beyond a second end of the sleeve at least with a portion in which a passage is formed connecting the space for receiving the temperature sensor to the external environment.

4. An end-piece according to claim 1 wherein each channel of the plurality of channels of the body is provided parallel with the longitudinal axis (X-X) of the tubular sleeve.

5. An end-piece according to claim 1, wherein each channel of the plurality of channels is positioned at an angle with respect to the longitudinal axis (X-X) of the tubular sleeve.

6. An end-piece according to claim 5, wherein each channel of the plurality of channels diverges from the longitudinal axis (X-X).

7. An end-piece according to claim 1, wherein the means for connection to the dispensing end of the vapour nozzle comprise a thread.

\* \* \* \* \*